Reissued Oct. 30, 1951 Re. 23,425

UNITED STATES PATENT OFFICE 23,425

POLYFLUORINATED COMPOUNDS

Jesse Harmon, Wilmington, Del., assignor to E. I. du Pont de Nemours & Company, Wilmington, Del., a corporation of Delaware No Drawing. Original No. 2,404,374, dated July 23, 1946, Serial No. 484,243, April 23, 1943. Application for reissue May 7, 1948, Serial No. 25,782

11 Claims. (Cl. 260—648)

Matter enclosed in heavy brackets [ ] appears in the original patent but forms no part of this reissue specification; matter printed in italics indicates the additions made by reissue.

This invention relates to halogenated hydrocarbons and more particularly to the production of polyhalogenated [cycloparaffins] *hydrocarbons.*

*This is an application for the reissue of my Patent No. 2,404,374.*

This invention has as an object a method for the preparation of completely [halogenated cycloparaffins] *halogen-substituted hydrocarbons* which are designated herein as polyfluorinated [cycloparaffins] *hydrocarbons* having the [structural] formula $$\left[\begin{array}{c} CX_2-(CX_2)_n-CX_2 \\ \hline \end{array}\right]$$

$C_nX_{2n}$, wherein X represents halogen of which at least 4 are fluorine and n is an integer *of at least 3.* A further object is the production of new fluorinated compounds of this kind. Other objects will appear hereinafter.

The above objects are accomplished by heating a completely halogenated polyfluoroethylene of the formula $CX_2=CX_2$ in which X is halogen and in which 2 or more of the halogens are fluorine. The conditions under which the polyfluorinated [cycloparaffins] *hydrocarbons* are formed without conversion to higher polymer consists in heating the polyfluorinated ethylene in the substantial absence of a polymerization catalyst (e. g. exclusion of air, oxygen, peroxygen compounds, etc.), or in the presence of polymerization stabilizers such as are disclosed in [copending applications of Dietrich and Joyce, Serial No. 476,028, filed February 15, 1943, Hanford, Serial No. 476,025, filed February 15, 1943, and Brubaker, Serial No. 476,027, filed February 15, 1943.] *United States Patents 2,407,405, 2,407,419 and 2,407,336.* The preparation of the stabilized tetrafluoroethylene, which is disclosed in the above identified [copending applications] *patents,* can be accomplished by different methods. One method consists in reducing the normally contained oxygen content (about 0.1 to 0.2% by volume) to not more than 40 parts per million parts of polyfluoroethylene. Another method consists in adding polymerization inhibiting compounds. Compounds of this kind are those containing thiol sulfur, examples of which are n-butyl mercaptan, hydrogen sulfide, etc., and compounds containing amine nitrogen, for example, ammonia, mono-, di-, and triamines. Many fluoroethylenes, other than tetrafluoroethylene, for example, trifluorochloroethylene and the difluorodichloroethylenes, are comparatively stable against polymerization on standing under pressure at normal temperature, and in the case of these compounds further treatment to stabilize these materials against polymerization is generally not necessary. The addition of these polymerization stabilizers permits the reaction to be carried out with polyfluoroethylenes which are contaminated with air or other polymerization catalysts.

A preferred form of the invention consists in subjecting a substantially pure completely halogenated polyfluoroethylene to elevated temperature and continuing the heating either as a batch process in a closed system or as a continuous flow process. The temperature required for the successful operation of the process varies inversely, to some extent, with the pressure used but is above about 125° C. in all instances. The pressures used are not critical but may be varied from atmospheric to 5000 lbs./sq. in. or even higher. At atmospheric pressure, higher temperatures are generally required.

In order to prepare completely halogenated polyfluorocyclobutanes, it is usually desirable to carry out the reactions under pressure at temperatures in the range of 125°–500° C. In order to prepare completely [halogenated polyfluorocyclopropanes] *halogen-substituted three carbon atom polyfluorohydrocarbons,* it is usually desirable to carry out the reaction by passing the polyhalogenated polyfluoroethylene through a reaction vessel at atmospheric pressure at the desired temperature which is usually in the range of 900° to 1400° C. The reaction products are scrubbed with water if gaseous or washed with water if liquid, dried and distilled.

The invention is further illustrated by the following examples in which parts are by weight.

*In the case of the polyfluorobutanes, and also in the case of the polyfluorinated hydrocarbons of higher carbon content, the compounds are believed to be cyclic in structure. Thus, the completely halogenated polyfluorobutanes are regarded as having the cyclic structure*

$$\left[\begin{array}{c} CX_2-CX_2-CX_2-CX_2 \\ \hline \end{array}\right]$$

*since the octaflorobutane is shown to be quite certainly octafluorocyclobutane for the reasons given in Example I. On the other hand, the present three carbon atom polyfluorohydrocarbons are regarded as having a linear or open chain structure and as being polyfluoropropenes since detailed investigation of the structure of the $C_3F_6$ compound shows quite conclusively that it is hexafluoropropene.*

EXAMPLE I

A stainless steel pressure vessel is flushed with nitrogen, closed, evacuated to about 1 mm. of mercury pressure, cooled in solid carbon dioxide and charged with 100 parts of tetrafluoroethylene containing less than 10 parts per million of oxygen. The reactor is heated with agitation at 200° C. for 13 hours and then allowed to cool to room temperature. The pressure is gradually bled down by releasing the gas into a solid carbon dioxide-acetone cooled receiver. The condensate, which amounts to 94 parts, is fractionally distilled through a low temperature still. Ten parts boiling at −56° C. to −5° C. and 80 parts boiling at −5° C. to −4° C. are obtained. The principal product is shown to be octafluorocyclobutane by molecular weight determination (Found: 197, Calcd. 200), and its great chemical inertness indicates that it does not contain ethylenic unsaturation. Pure octafluorocyclobutane boils at −5° C. and melts at −48° C. It is not changed by heating at 200° C. for 2 hours under 2000 lbs./sq. in. hydrogen pressure in the presence of 20% of its weight of a nickel-on-kieselguhr hydrogenation catalyst. It is not changed by heating under pressure at 100° C. in the presence of 2.5% of its weight of benzoyl peroxide for 6 days. Likewise, it remains unchanged when heated in a closed system under pressure with 50% of its weight of zinc dust at 200° C. for 3 hours, with half its weight of anhydrous aluminum chloride at 100° C. for 4 days and with half its weight of anhydrous antimony pentachloride at 100° C. for 4 days. It is not oxidized by dilute aqueous potassium permanganate and it does not react with bromine even in sunlight.

EXAMPLE II

A silver lined pressure vessel is evacuated to free it of air and then charged with 150 parts of anhydrous hydrogen fluoride and 50 parts of tetrafluoroethylene which contains 0.1% to 0.2% by weight of oxygen and 0.5% by weight of "Terpene B" which is a $C_{10}H_{16}$ hydrocarbon fraction consisting mainly of dipentene and terpinolene boiling at 176°–196° C., having an $n_D^{20}$ of 1.470–1.478 and a $d^{15.5}$ of 0.855–0.870. The vessel is heated while agitating at 197° to 200° C. for 8 hours. The product is then discharged by releasing the gases through an ice-water scrubber and then into a solid carbon dioxide-acetone cooled receiver. The condensate in the latter receiver amounts to 40 parts. It is fractionally distilled in a low temperature still whereupon 5.5 parts of a fraction, boiling at −48° to −45° C., having a molecular weight of 112.5; and 21.5 parts of a second fraction, boiling at −5.5° to −4.5° C., having a molecular weight of 194, were obtained. The first fraction is pentafluoroethane formed by the addition of hydrogen fluoride to tetrafluoroethylene while the second fraction is octafluorocyclobutane.

EXAMPLE III

A stainless steel lined reactor is evacuated to about 1 mm. of mercury pressure and then charged with 195 parts of chlorotrifluoroethylene. The reactor is mounted in a horizontal position, agitated and heated at 200° C. for 11 hours. The product is discharged and the product which is a liquid, is washed with water, dried and distilled. One hundred and twenty-four parts of dichlorohexafluorocyclobutane, which boils at 58° to 59° C., is obtained. Analysis: Calcd. for $C_4Cl_2F_6$: F, 48.9; Cl, 30.45; molecular weight, 233; $M_D$, 28.09. Found: F, 48.65; Cl, 30.17; molecular weight, 222, 225, 227; $M_D$, 28.12; $n_D^{20}$, 1.3339; $d_4^{20}$, 1.6462. Ninety-four parts of dichlorohexafluorocyclobutane dissolved in 100 parts of absolute alcohol is treated with 75 parts of zinc dust by heating under reflux for 4 hours. The reaction product which distills from the reaction mixture is dried by passing through a calcium chloride drying tube and collected in a solid carbon dioxide-acetone cooled vessel. Upon distillation, 49 parts of hexafluorocyclobutene boiling at 5° to 6° C. is obtained. The molecular weight of the product is found to be 157. The theoretical value of hexafluorocyclobutene is 162. Hexafluorocyclobutene absorbs bromine from a carbon tetrachloride solution to give 1,2-dibromohexafluorocyclobutane. Forty-nine parts of hexafluorocyclobutene is treated with moist bromine in sunlight to obtain 32 parts of 1,2-dibromohexafluorocyclobutane boiling at 96° C. Analysis: $n_D^{20}$, 1.3889; $d_4^{20}$, 2.1981; F, 35.96; Br, 49.08; Calcd. for $C_4F_6Br_2$: F, 35.4; Br, 49.7.

EXAMPLE IV

A silver lined pressure vessel is charged as in Example I with 150 parts of anhydrous hydrogen fluoride and 60 parts of 1,1-dichloro-2,2-difluoroethylene. The vessel is heated while agitating at 199° to 200° C. for 10½ hours, discharged and the product is washed with water, dried and distilled. A yield of 2.4 parts of tetrachlorotetrafluorocyclobutane which distills at 128°–129° C. and melts at 81° C. is obtained. Analysis: Calcd. for $C_4F_4Cl_4$: F, 28.55, Cl, 53.3. Found: F, 28.4; Cl, 52.74.

EXAMPLE V

A 34" length of #24 gauge platinum wire is suspended as a double loop inside a long cylindrical copper vessel and heated electrically to a bright redness (1340° C. by optical pyrometer). Tetrafluoroethylene containing 0.5% of "Terpene B" is passed into the top of this cell at the rate of 24.4 parts per hour and the pyrolysis products are collected in a receiver cooled with a solid carbon dioxide-acetone mixture. Tetrafluoroethylene is passed into the reaction vessel for 20.5 hours and the volatile constituents, which amount to 478 parts are fractionally distilled. Upon distillation, 213 parts of [hexafluorocyclopropane] *hexafluoropropene* boiling at −31° C. is obtained. Upon treatment of 69 parts of [hexafluorocyclopropane] *hexafluoropropene* with aqueous bromine in direct sunlight 66 parts of [1,3-dibromohexafluoropropane] *dibromohexafluoropropane* boiling at 70° to 72° C. is obtained. Analysis: $n_D^{20}$, 1.3590; $d_4^{20}$, 2.1728; Br, 50.82; Calcd. for $C_3F_6Br_2$: Br, 51.6.

[1,3 - dibromohexafluoropropane] *Dibromohexafluoropropane* is debrominated by treatment with zinc dust in alcohol by heating under reflux. Fifty-nine parts of [hexafluorocyclopropane (B. P. −31° C.)] *hexafluoropropene (B. P. −31° C.)* is thus obtained from 140 parts of [1,3-dibromohexafluoropropane.] *dibromohexafluoropane.* Upon treatment of [hexafluorocyclopropane] *hexafluoropropene* with 5% aqueous hydrofluoric acid at 200° C. heptafluoropropane (B. P. −18.5° to −17° C.) is obtained.

EXAMPLE VI

A steel jacketed silver tube (0.6" I. D. x 54" long) is heated at 695° to 730° C. over a 36" section and 270 parts of tetrafluoroethylene containing 0.5% of "Terpene B" is passed through at atmospheric pressure during 4.5 hours. The effluent gases are passed in order through a water scrubber, calcium chloride drier, and collected in a receiver cooled with a solid carbon dioxide-acetone mixture. The condensate, which amounts to 225 parts, is distilled to obtain 12 parts of a product boiling in the range of −63° to −32° C., 56 parts boiling at −32° to −23° C., 16 parts boiling at −23° to −7° C., 90 parts at −7° to −5° C., and 22 parts at −5° to +13° C. The fraction boiling at −7° to −5° C. is bubbled through moist bromine in bright [sun light] *sunlight,* scrubbed with 10% sodium hydroxide solution, dried and redistilled. The purified product distills at −4° to −5° C. and is shown to be octafluorocyclobutane. The fraction boiling at −32° to −23° C. is refractionated and found to boil at −31° C. and is [therefore hexafluorocyclopropane.] *hexafluoropropene.*

Octafluorocyclobutane is converted into [hexafluorocyclopropane] *hexafluoropropene* by passing octafluorocyclobutane through the hot filament pyrolysis apparatus described in Example V. Thus, in an experiment in which 32 parts of octafluorocyclobutane was passed through the pyrolysis apparatus during the course of 8 hours, 6 parts of tetrafluoroethylene, 10 parts of [hexafluorocyclopropane] *hexafluoropropene* and 11 parts of unchanged octafluorocyclobutane are obtained.

EXAMPLE VII

The silver pyrolysis tube (described in Example VI) is filled with 8–14 mesh activated charcoal. The top of the tube is connected to a cylinder containing tetrafluoroethylene while the lower end of the tube is connected, in turn, to a water cooled condenser, a bleed down valve, a drying tube and finally a solid carbon dioxide-acetone cooled receiver. Two hundred and eighty parts of tetrafluoroethylene is passed through the tube heated to 420°–450° C. at a pressure of 30–35 lbs./sq. in. during 3 hours. Fifteen parts of liquid product ($d_4^{25}$, 1.6849; molecular weight 370) is collected at the water cooled condenser and 87 parts of product is collected in the solid carbon dioxide-acetone cooled receiver. Upon fractionation of the lower boiling product, 41 parts of octafluorocyclobutane is obtained. The liquid product is believed to be a mixture of higher boiling completely fluorinated cycloparaffins such as decafluorocyclopentane, dodecafluorocyclohexane and tetradecafluorocycloheptane, etc. A fraction having a molecular weight of 408 which corresponds to hexadecafluorocyclooctane is isolated from this mixture.

Among the completely halogenated polyfluoroethylenes which are applicable in this invention are chlorotrifluoroethylene, 1,1-difluoro-2,2-dichloroethylene, 1,2-difluoro-1,2-dichloroethylene, bromotrifluoroethylene and tetrafluoroethylene. However, the polyfluoroethylenes containing 3 fluorine atoms react more readily than those containing 2 fluorine atoms. Tetrafluoroethylene is particularly preferred as it reacts the most readily.

The present process can be carried out conveniently either as a batch process in a closed system or as a continuous flow process. The temperature required for the successful operation of the process varies inversely, to some extent with the pressure used but is above about 125° C. in all cases. The pressures used are not critical but may be varied from atmospheric to 5000 lbs./sq.

in. or even higher. When higher temperatures, e. g., above 500° C. are used the reaction is generally carried out at atmospheric pressure using the continuous flow process. The operating conditions can be varied widely depending upon the products desired. Thus, at lower temperatures, e. g., in the range of 125° to 500° C., high yields of completely halogenated polyfluorocyclobutanes are obtained, whereas the formation of completely [halogenated polyfluorocyclopropanes] *halogen-substituted polyfluoropropenes* is favored where the reaction is carried out in the temperature range of 900° to 1400° C. In the intermediate range of 500° to 900° C., mixtures of completely [halogenated polyfluorocycloparaffins] *halogen-substituted polyfluorohydrocarbons* are obtained. The time required for carrying out the reaction can be varied from a few minutes to several days depending upon the operating conditions such as temperature and pressure.

The process can be operated continuously or intermittently. The reaction can be carried out in a closed system or in the vapor phase by passing the completely halogenated polyfluoroethylene through a hot reaction tube. The reaction can be carried out under subatmospheric, atmospheric, or superatmospheric pressure in the range of .01 to 1000 atmospheres. The preferred pressure range is 1 to 200 atmospheres.

The reaction can be carried out in any suitable reaction vessel such as iron, steel, stainless steel, silver, platinum, Monel metal, copper and other metals and alloys which are capable of withstanding heat and pressure. In the batch process the reaction is preferably carried out with agitation although agitation is not always necessary.

Although there is no objection to the presence of small amounts of water in carrying out the process of this invention, it is preferable that the reaction be conducted under substantially anhydrous conditions. However, in certain cases, the presence of water may be advantageous to help dissipate the heat of the reaction. Other adjuvants are not usually necessary but in some instances a variety of materials may be added to the reaction mixture. These include activated charcoal, hydrofluoric acid, sodium fluoride, calcium fluoride, borax, etc.

The products obtained by the practice of this invention are useful as heat transfer liquids in refrigerating systems and as various chemical intermediates such as in the production of dyestuffs, [pharmaceuticals,] solvents, etc.

As many apparent widely different embodiments of this invention may be made without departing from the spirit and scope thereof, it is to be understood that I do not limit myself to the specific embodiments thereof except as defined in the appended claims.

I claim:

[1. A process for preparing completely halogenated polyfluorocycloparaffins which comprises heating at a temperature of at least 125° C. a completely halogenated ethylene of the formula $CX_2{=}CX_2$ wherein X is halogen and at least 2 of the halogens are fluorine.]

[2. A process for preparing completely halogenated polyfluorocycloparaffins which comprises heating a completely halogenated ethylene of the formula $CX_2{=}CX_2$ wherein X is halogen and at least 2 of the halogens are fluorine at a temperature of 125° C. to 1400° C.]

3. A process for preparing completely halogenated polyfluorocyclobutane which comprises heating a halogenated ethylene of the formula $CX_2=CX_2$ wherein X is halogen and at least 2 of the halogens are fluorine, said process comprising heating said halogenated ethylene at a temperature of 125° C. to 500° C. under superatmospheric pressure.

[4. A process for preparing completely halogenated polyfluorocyclopropane which comprises heating a halogenated ethylene of the formula $CX_2=CX_2$ wherein X is halogen and at least 2 of the halogens are fluorine, at a temperature of 900° C. to 1400° C. at atmospheric pressure.]

[5. The process set forth in claim 1 in which at least 2 of the halogen substituents are fluorine and the remainder are chlorine.]

[6. A volatile completely halogenated polyfluorocyclobutane of the formula

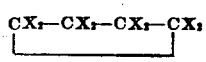

in which X is halogen and in which at least 4 of the substituent X are fluorine and at least 2 are halogen other than fluorine.]

7. A process for preparing octafluorocyclobutane which comprises heating tetrafluoroethylene at a temperature of 125 ° C. to 500° C. under superatmospheric pressure.

[8. A process for preparing hexafluorocyclopropane which comprises heating tetrafluoroethylene at a temperature of 900° C. to 1400° C. at atmospheric pressure.]

[9. The volatile completely halogenated polyfluorocyclobutane of the formula set forth in claim 6 in which 6 of the substituent X are fluorine and the remaining two are chlorine.]

*10. A process for preparing completely halogenated polyfluorohydrocarbons which comprises heating at a temperature of at least 125° C. a completely halogenated ethylene of the formula $CX_2=CX_2$, wherein X is halogen and at least 2 of the halogens are fluorine.*

*11. A process for preparing completely halogenated polyfluoropropene which comprises heating a halogenated ethylene of the formula $CX_2=CX_2$, wherein X is halogen and at least 2 of the halogens are fluorine, at a temperature of 900° C. to 1400° C. at atmospheric pressure.*

*12. The process set forth in claim 10 in which at least 2 of the halogen substituents are fluorine and the remainder are chlorine.*

*13. A process for preparing hexafluoropropene which comprises heating tetrafluoroethylene at a temperature of 900° C. to 1400° C. at atmospheric pressure.*

*14. A process for preparing completely halogenated polyfluorohydrocarbons which comprises heating at a temperature of about 200° C. to about 800° C. a completely halogenated ethylene of the formula $CX_2=CX_2$, wherein X is a halogen and at least 2 of the halogens are fluorine.*

*15. A process for preparing completely halogenated polyfluorhydrocarbons which comprises heating at a temperature of about 200° C. to about 800° C. a completely halogenated ethylene of the formula $CX_2=CX_2$, wherein X is a halogen and at least 2 of the halogens are fluorine and the remainder are chlorine.*

*16. A process for preparing at least one compound of the group selected from hexafluoropropene and octafluorocyclobutane which comprises heating tetrafluoroethylene at a temperature of about 400° C. to about 800° C.*

*17. Dichlorohexafluorocyclobutane, having a boiling point of about 59°.*

*18. A volatile completely halogenated polyfluorocyclobutane of the class consisting of dichlorohexafluorocyclobutane having a boiling point of about 59° C., 1,2-dibromohexafluorocyclobutane and tetrachlorotetrafluorocyclobutane which distills at about 129° C.*

JESSE HARMON.

No references cited.